United States Patent
Chirol et al.

(10) Patent No.: US 10,160,179 B2
(45) Date of Patent: Dec. 25, 2018

(54) METHOD OF REINFORCING A STRATIFIED COMPOSITE MATERIAL PART COMPRISING AT LEAST ONE THROUGH-HOLE, REINFORCED STRATIFIED COMPOSITE MATERIAL PART

(71) Applicant: Airbus Operations (SAS), Toulouse (FR)

(72) Inventors: Clement Chirol, Trebons sur la Grasse (FR); Victor Achard, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 323 days.

(21) Appl. No.: 14/805,168

(22) Filed: Jul. 21, 2015

(65) Prior Publication Data

US 2016/0023425 A1    Jan. 28, 2016

(30) Foreign Application Priority Data

Jul. 23, 2014   (FR) ..................................... 14 57101

(51) Int. Cl.
| | | |
|---|---|---|
| *B32B 3/24* | (2006.01) | |
| *B32B 3/26* | (2006.01) | |
| *B32B 5/26* | (2006.01) | |
| *B29C 70/54* | (2006.01) | |
| *B29L 31/00* | (2006.01) | |

(52) U.S. Cl.
CPC ............ *B32B 3/266* (2013.01); *B29C 70/545* (2013.01); *B32B 3/263* (2013.01); *B32B 5/26* (2013.01); *B29L 2031/737* (2013.01); *B32B 2605/18* (2013.01)

(58) Field of Classification Search
CPC ........................ Y10T 428/24314; B32B 3/266
See application file for complete search history.

(56) References Cited

U.S. PATENT DOCUMENTS

2005/0077427 A1* 4/2005 Brenner .................... B64C 1/12
                                                                                  244/117 R

FOREIGN PATENT DOCUMENTS

| EP | 2476541 | 7/2012 | |
|---|---|---|---|
| EP | 2476541 A1 * | 7/2012 | ........... B29C 70/545 |
| FR | 2951400 | 4/2011 | |

OTHER PUBLICATIONS

French Search Report, dated Apr. 8, 2015.

* cited by examiner

*Primary Examiner* — William P Watkins, III

(74) *Attorney, Agent, or Firm* — Greer, Burns & Crain, Ltd.

(57) ABSTRACT

A method of reinforcing a composite material part comprising a stack of fiber layers and at least one hole with an axis. The hole crosses the layers and opens out at the level of a first face and a second face of the part. The method comprises at least one stage in the making of at least one notch in at least one layer of the part proximate to the hole or which opens out in the hole.

15 Claims, 3 Drawing Sheets

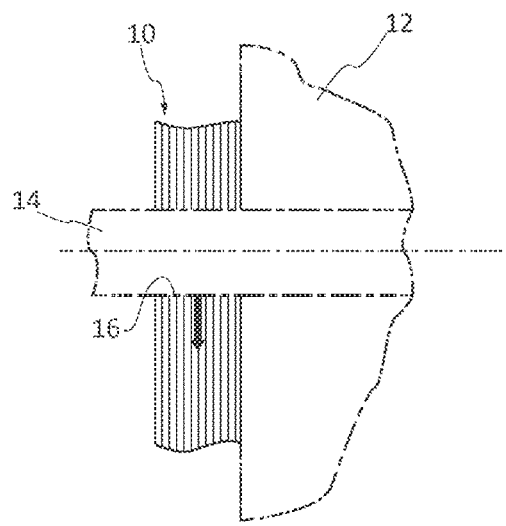
Fig. 1
Prior Art
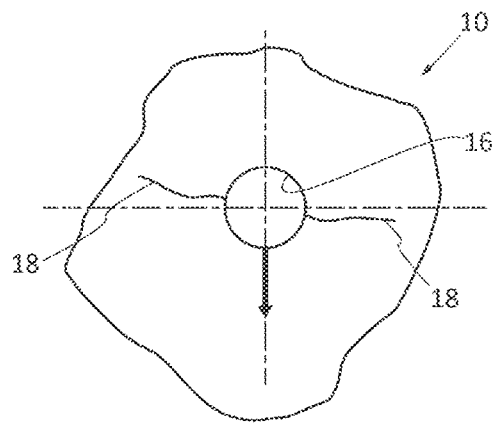
Fig. 2
Prior Art
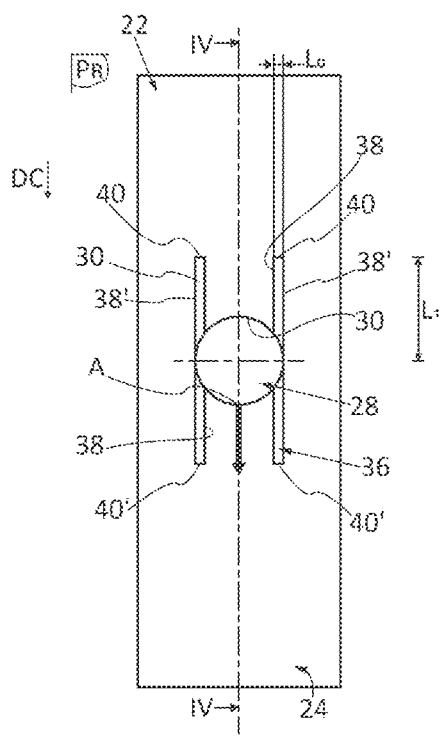
Fig. 3
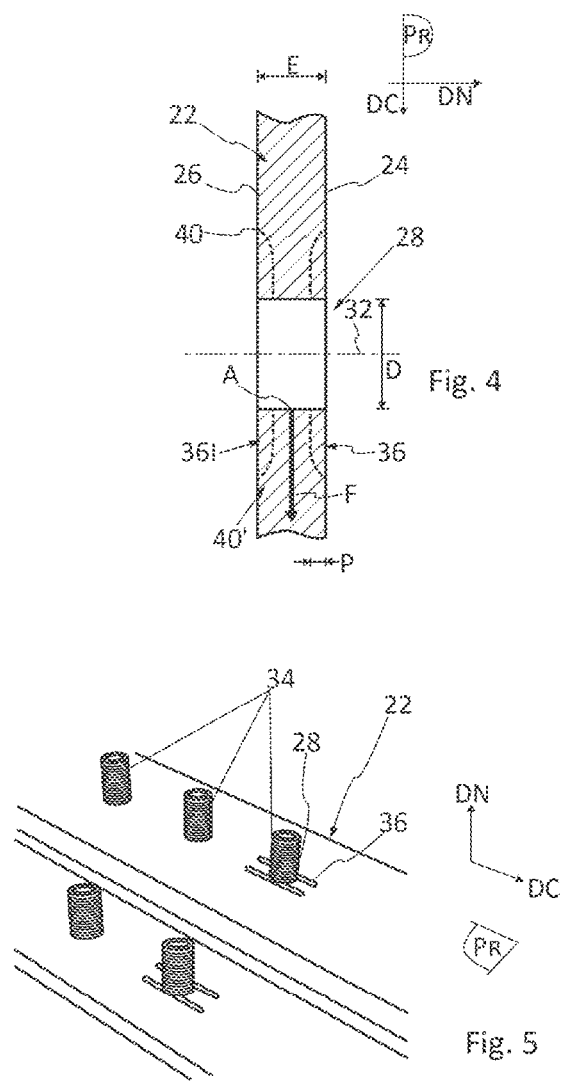
Fig. 4
Fig. 5

METHOD OF REINFORCING A STRATIFIED COMPOSITE MATERIAL PART COMPRISING AT LEAST ONE THROUGH-HOLE, REINFORCED STRATIFIED COMPOSITE MATERIAL PART

CROSS-REFERENCES TO RELATED APPLICATIONS

This application claims the benefit of the French patent application No. 1457101 filed on Jul. 23, 2014, the entire disclosures of which are incorporated herein by way of reference.

BACKGROUND OF THE INVENTION

The present invention relates to a method of reinforcing a stratified composite material part comprising at least one through-hole, as well as a reinforced stratified composite material part.

Stratified composite materials are widely used in the aeronautical field, particularly on account of their mechanical resistance and high specific modulus of elasticity.

A stratified composite material part comprises a stack of fiber layers which are embedded in a resin matrix.

In most cases, as illustrated in FIGS. 1 and 2, a stratified composite material part 10 is connected to other parts 12 by means of at least one fastening 14, such as a bolt or a rivet, for example, and comprises at least one through-hole 16 to partially accommodate the fastening 14. Said fastening makes it possible to guarantee not only the connection between the parts 10 and 12, but likewise the transmission of forces between them. Depending on the forces transmitted, a flow of more or less significant stresses passes along the edge of the hole.

The stress concentration zones, such as a hole for example, are sensitive zones for the composite material parts, as stress concentrations are zones that are susceptible the appearance of premature damage to the composite material. As a result, one or a plurality of cracks 18, loss of fiber/matrix cohesion, delamination may appear from the hole.

In the case of a composite material, the machining of a hole results in the fibers being cut, which necessarily alters the mechanical characteristics of the part, but likewise generates faults such as micro-cracks at the wall of the hole, for example.

In the case of a composite material, in the absence of significant plastic deformation, the single point stress of a fault (such as a micro-crack) grows very significantly until the composite ruptures.

In order to improve the mechanical performance of a composite material part, a solution involves increasing the thickness of the part at the level of the holes, so as to increase the size of the working section. However, this solution leads to an increase in the weight of the part and therefore the total weight of the aircraft. Moreover, this local increase in the thickness of the part about the holes may make the shaping of the part more complex and therefore increase its cost.

Another solution involves disposing an insert in the form of a tube in the hole to improve the transmission of stress flows. However, this solution makes the manufacturing process more complex and therefore increases the cost of the part.

Other solutions aimed at improving the quality of the drilling have been developed, in order to reduce the risks of an incipient break. Even if these solutions allow the characteristics of the composite material part to be improved, they lead to an increase in the cost of the part.

SUMMARY OF THE INVENTION

The present invention also aims to correct the disadvantages of the prior art by proposing a method intended to reinforce a stratified composite material part about a hole.

To this end, an object of the invention is a method of reinforcing a composite material part comprising a stack of fiber layers and at least one hole crossing said layers and opening out at the level of a first face and a second face of said part, characterized in that the method comprises at least one stage in the making of at least one notch in at least one layer of the part proximate to the hole or which opens out in the hole.

This solution enables the mechanical characteristics to be improved by redistributing the stresses away from the hole, which helps to protect the peripheral zone of the hole by limiting the appearance of defects such as delamination or cracks.

Moreover, the presence of the notch allows the propagation of low-level artificial damage in a direction corresponding to the direction of the notch to be simulated and the single point stress concentration of a fault to be significantly reduced and the propagation of cracks in all other directions to be limited.

According to a first variant, the method comprises stages aimed at determining at least one loading direction, the notch being oriented in a parallel direction to the loading direction.

According to a second variant, the method comprises stages intended to determine at least one critical cracking direction, the notch being oriented in a direction perpendicular to the critical cracking direction.

The notch is advantageously tangential to the hole, so that the area of the net loading section remains unchanged.

According to another characteristic, the method comprises a placement stage of a metallic insert to fill the notch. This solution allows the part to acquire greater resistance to peening.

The notch is advantageously equal in length to the radius of the hole. This solution allows the distribution of stresses about the hole to be optimized.

According to another characteristic, for a same hole, a plurality of notches is made, said notches being oriented in one direction and disposed symmetrically in relation to a first plane of symmetry passing through the axis of the hole perpendicular to the direction of the notches.

According to another characteristic, for a same hole, a plurality of notches is made, said notches being oriented in one direction and disposed symmetrically in relation to a second plane of symmetry passing through the axis of the hole parallel to the direction of the notches.

According to another characteristic, when the part comprises a plurality of holes aligned in an alignment direction, the method comprises a stage intended to make at least one notch which links a plurality of holes and which is parallel to the alignment direction.

The notch advantageously has a depth smaller than the thickness of the part.

According to one embodiment, at least a first notch opens out at the level of the first face and at least a second notch opens out at the level of the second face.

Another object of the invention is a method of making a stratified composite material part incorporating a reinforcement method according to the invention.

According to a first variant, at least one layer of fibers is cut prior to a polymerization or consolidation stage of the part, in order to form at least one notch.

According to another variant, the part is machined after the polymerization or consolidation stage to form at least one notch.

An object of the invention is likewise a stratified composite material part which is reinforced using the reinforcement method in the invention or which is obtained from the method for making a stratified composite material part according to the invention.

BRIEF DESCRIPTION OF THE DRAWINGS

Other characteristics and advantages will emerge from the following description of the invention, a description provided simply by way of example in relation to the attached drawings in which:

FIG. 1 is a section through a composite material part which illustrates the prior art, FIG. 2 is a face view of a composite material part which illustrates the prior art, FIG. 3 is a face view of a composite material part with a through-hole which illustrates the invention, FIG. 4 is a section along line IV-IV in FIG. 3, FIG. 5 is a perspective view of a composite material part with a plurality of through-holes which illustrates an embodiment of the invention.

DETAILED DESCRIPTION OF THE PREFERRED EMBODIMENTS

Figure 6A:
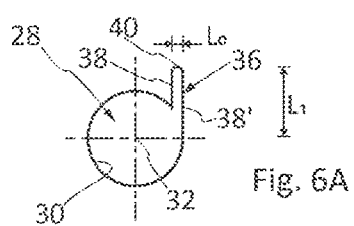
FIGS. 6A and 6B are face views of a composite material part with a through-hole which illustrate two other variants of the invention with different notch widths.

FIGS. 3 to 4 show a stratified composite material part 22. This part comprises a stack of fiber layers embedded in a resin matrix.

The fibers and the resin used are no longer specified as they vary from one part to the next.

According to the example illustrated, the part 22 is a plate with a first face 24 and a second face 26 parallel to one another. The layers of the part are generally parallel to the faces 24 and 26.

In the description that follows, reference plane Pr should be understood to mean a plane parallel to the fiber layers and generally parallel to the faces 24 and 26. A normal direction DN is a direction perpendicular to the reference plane Pr.

This part 22 comprises at least one hole 28 which opens out at the level of the first face 24 and of the second face 26. According to other variants illustrated in FIGS. 5 and 10, the part comprises a plurality of holes 28.

This hole 28 is delimited by a wall 30 which comprises generators perpendicular to the faces 24 and 26. The hole 28 has a circular section with a diameter D in the reference plane Pr and an axis 32 parallel to the normal direction DN. The part 22 has a thickness E at the level of the axis 32 of the hole.

However, the invention is not limited to this geometry for the hole 28. Hence, the hole 28 may have a non-circular section, an oblong section for example, its axis 32 and the generators of its wall 30 may not be oriented in the normal direction DN.

This part 22 is intended to be assembled to at least one other part thanks to at least one fastening 34 (shown in FIG. 5), such as a bolt or a rivet, for example, housed at least in part in the hole 28. This link 34 generates a force on the part 22, a component F whereof is disposed in the reference plane Pr and extends from a point A on the wall 30 of the hole.

In the description that follows, the loading direction DC is parallel to the component F.

To reinforce the part 22, the invention provides for a method of reinforcement that comprises at least one stage for making at least one notch 36 in at least one layer of the part proximate to the hole 28 or which opens out in the hole 28.

A notch 36 corresponds to a nick in at least one layer intended to cut the fibers of said layer along a cutting line that corresponds to the orientation of the notch 36.

"Proximate" means that the distance separating the hole 28 and the notch 36 is smaller than or equal to the radius of the hole 28.

According to one embodiment, in a plane parallel to the reference plane Pr, a notch 36 is rectilinear and delimited by two lateral edges 38, 38' parallel to one another.

Figure 8A:
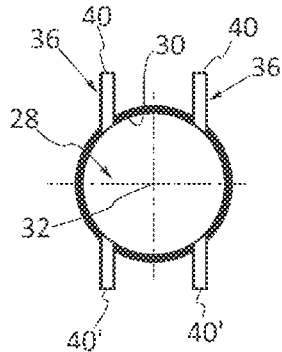
FIGS. 8A to 8C are face views of a composite material part with a through-hole which illustrate three other variants of the invention with positions for different notches.
Figure 8B:
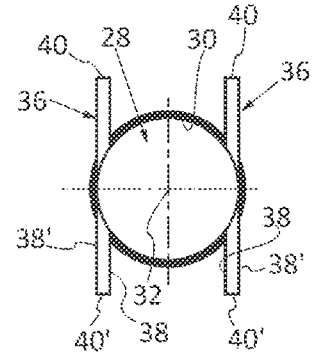
Figure 8C:
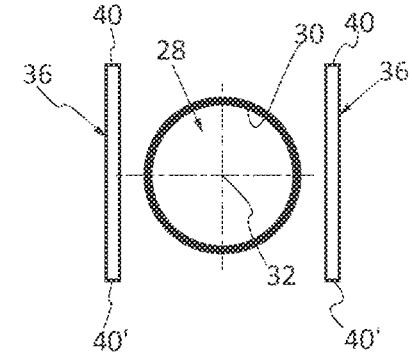

When the notch 36 does not intersect a hole 28, as illustrated in FIG. 8C, or extends on either side of a hole 28, as illustrated in FIGS. 8A and 8B, it comprises two end edges 40, 40'. When the notch 36 opens out in a hole 28, it comprises an end edge 40 perpendicular to the side edges 38, 38', as illustrated in FIG. 6A.

Alternatively, a notch 36 connects two holes. In this case, the notch does not have an end edge.

The notch 26 is characterized by:
  a length L1 that corresponds to the length of the longest side edge,
  a length L0 that corresponds to the distance separating the side edges 38 and 38' (or the length of the end edge),
  a depth p that corresponds to the size of the notch 36 in the normal direction DN.

According to a first variant, the notch 36 is oriented such that its length L1 (the greatest dimension of the notch in the reference plane Pr) is parallel to the loading direction.

The fact that at least one notch 36 oriented in the loading direction DC is provided makes it possible to simulate the propagation of low-level artificial damage parallel to the loading direction DC. Hence, the presence of the notch 36 allows the single point stress concentration of a fault to be significantly reduced and the propagation of cracks in all the other directions to be limited, particularly in a transverse direction perpendicular to the loading direction DC.

According to another aspect, a redistribution of stresses spaced apart from the hole 28 is detected, which helps to protect the peripheral zone of the hole 28 by limiting the appearance of faults such as delamination or cracks.

For certain applications, it is possible to determine a critical cracking direction which may be different from the loading direction DC. This critical cracking direction corresponds to the crack propagation direction.

According to a second variant, the notch 36 is oriented such that its length L1 (the greatest dimension of the notch in the reference plane Pr) is perpendicular to the critical cracking direction.

Advantageously, according to this second variant, the notch 36 is positioned in such a manner as to be tangential to the hole, as illustrated in FIG. 8B.

The notch 36 is preferably positioned in such a manner as to be internally tangential to the hole.

"Internally tangential" means that the side edge 38' furthest away from the axis 32 of the hole 28 is tangential to the wall 30 of the hole. This configuration allows the sectional surface of the part not to be reduced in a plane perpendicular to the loading direction DC and passing through the axis 32.

According to another variant illustrated in FIG. 8A, for problems of leak-tightness or load distribution generated by the fastening, the distance between the notch 36 and the axis 32 of the hole is smaller than the radius of the hole. According to another variant illustrated in FIG. 8C, for the same reasons the distance between the notch 36 and the axis 32 of the hole is greater than the radius of the hole.

Figure 11A:
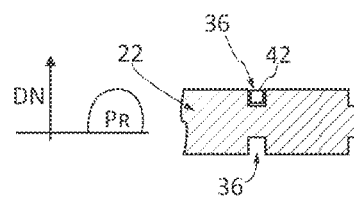
FIG. 11A is a section along line A-A in FIG. 10.
Figure 11B:
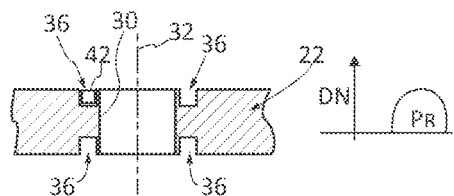
FIG. 11B is a section through line B-B in FIG. 10.

At least one notch 36 preferably comprises a metallic insert 42, the shapes whereof are identical to those of the notch such that the notch 36 is filled by the metallic insert 42, as illustrated in FIGS. 11A and 11B. This configuration means that the resistance to peening is not reduced and leak-tightness problems can be resolved.

According to one embodiment, the metallic insert 42 is a specific member distinct from the fastening 34.

According to another embodiment, the metallic insert 42 and the fastening 34 only form a single, unique member.

Alternatively, the notch or notches are filled with a resin or mastic to solve leak-tightness problems.

Figure 7A:
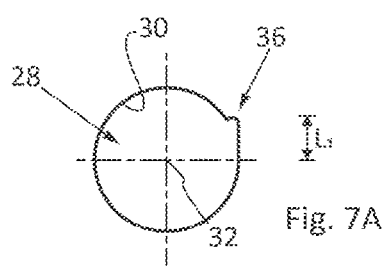
FIGS. 7A and 7B are face views of a composite material part with a through-hole which illustrate two other variants of the invention with different notch lengths.
Figure 7B:
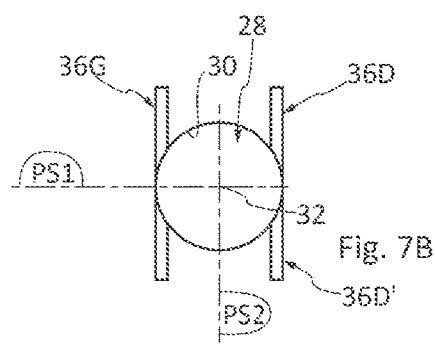

The part advantageously comprises for a same hole 28, as illustrated in FIG. 7B, notches 36D, 36D' disposed symmetrically in relation to a first plane of symmetry PS1 passing through the axis 32 of the hole and perpendicular to the direction of the notches (corresponding to the length of the notches 36D, 36D'). This configuration allows the distribution of stresses to be homogenized.

Alternatively, the part comprises for a same hole 28 notches 36D, 36D' disposed asymmetrically in relation to the first plane of symmetry PS1. This configuration is more particularly adapted when the loading principally involves peening because it allows the section subject to the peening pressure to be kept constant and buckling and delamination of the layers to be avoided.

The part advantageously comprises for a same hole 28 notches 36D and 36G disposed symmetrically in relation to a second symmetrical plane PS2 (perpendicular to the first plane of symmetry PS1) passing through the axis 32 of the hole parallel to the direction of the notches (corresponding to the length of the notches 36D, 36G). This configuration allows the distribution of stresses to be homogenized.

The part advantageously comprises notches 36D, 36D', 36G, 36G' disposed symmetrically in relation to the planes of symmetry PS1 and PS2.

Figure 12:
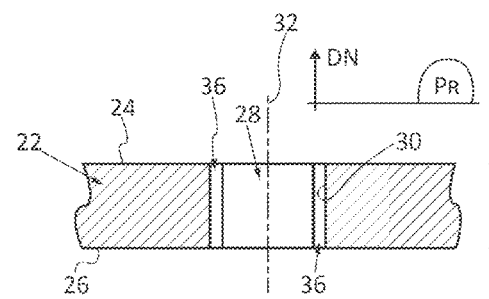
FIG. 12 is a section of a composite material part with a through-hole which illustrates another variant of the invention comprising at least one through-hole.

According to an embodiment shown in FIG. 12, the notch 36 (or the notches 36 and 36') has a depth p equal to the thickness E of the part.

Figure 13:
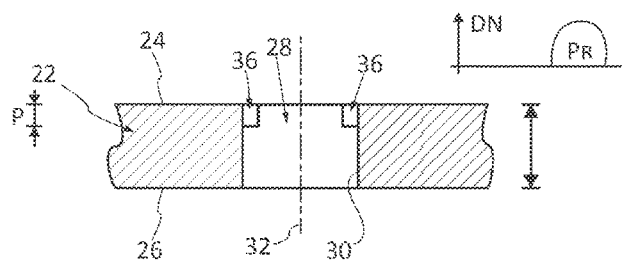
FIG. 13 is a section through a composite material part with a through-hole which illustrates another variant of the invention comprising two notches on only one face of the part.

In order to preserve a maximum amount of material and prevent the part 22 from becoming too fragile, according to an embodiment illustrated in FIGS. 4 and 13, the notch 36 (or the notches 36, 36') has a depth p smaller than the thickness E of the part.

The notch 36 advantageously has a depth p smaller than 50% of the thickness E of the part.

According to an embodiment not shown, the notch 36 does not open out at the level of the faces 24 and 26. The notch is provided in the material. This solution allows problems of leak-tightness or load distribution generated by the fastening to be solved.

According to an embodiment shown in FIG. 13, the notch (or the notches 36, 36') opens out at the level of a single face of the part 22.

According to an embodiment shown in FIG. 5, the part comprises for a same hole at least a first notch 36 which opens out at the level of the first face 24 and at least a second notch 361 which opens out at the level of the second face 26. This configuration enables the distribution of stresses to be homogenized.

The number of notches opening out in the hole 28 and/or the distribution of notches about the hole 28 are determined in such a manner as to achieve a compromise between the homogenization of stresses and the resistance to peening.

Figure 6B:
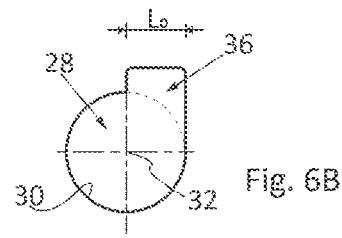

The width L0 of the notch or notches 36 is advantageously as small as possible, in order to keep the maximum amount of material, as illustrated in FIG. 6A. According to one embodiment, the width L0 of the notch is in the order of 0.6 mm. However, the invention is not limited to this width L0. The width is preferably smaller than or equal to the radius of the hole, as illustrated in FIG. 6B.

The notch 36 has a length of L1 which can vary by a few millimeters, as illustrated in FIG. 7A, to several centimeters.

The length L1 of the notch 36 is advantageously equal to the radius of the hole 28. This configuration allows a better compromise to be reached between the equalization of the stress concentrations in a direction parallel to the length L1 of the notch and the maintenance of the mechanical characteristics of the part in the other directions.

Figure 9A:
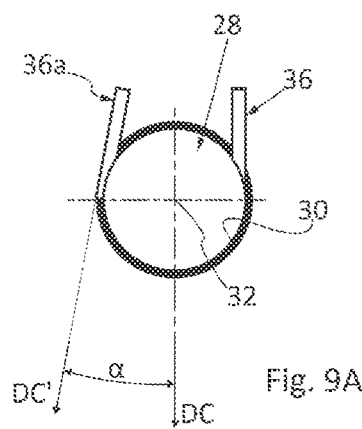
FIGS. 9A and 9B are face views of a composite material part with a through-hole which illustrate two other variants of the invention with orientations for different notches.
Figure 9B:
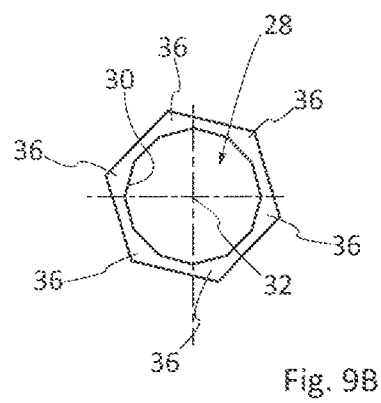
Figure 10:
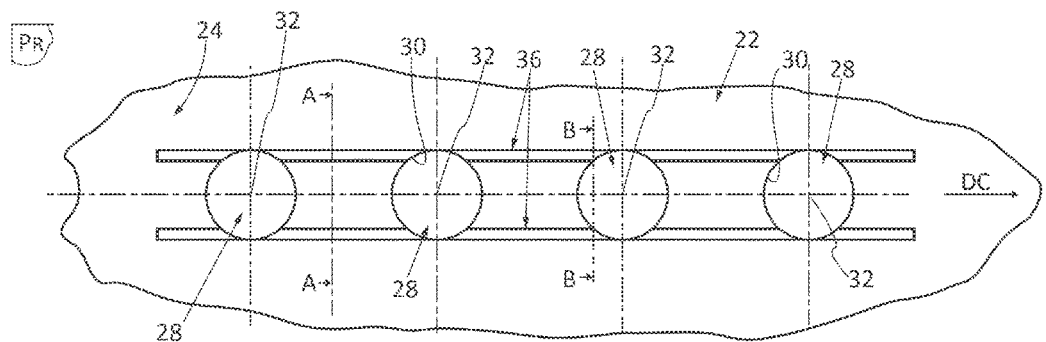
FIG. 10 is a face view of a composite material part comprising a plurality of holes which illustrates another variant of the invention.

When the part comprises at least one row of holes, the axes 32 of the holes being aligned in an alignment direction, as illustrated in FIG. 10, the part comprises at least one notch 36 which links a plurality of holes and which is oriented in the alignment direction, in order to simplify machining and homogenize the cracking directions. As illustrated in FIGS. 9A and 9B, for a same hole, the part comprises notches oriented in a plurality of directions.

According to a first embodiment illustrated in FIG. 9A, the part is subjected to two loading directions DC and DC' forming an angle α. In this case, the part comprises at least a first notch 36 oriented in a first loading direction DC and at least a second notch 36a oriented in the second loading direction DC'.

According to another embodiment illustrated in FIG. 9B, the part comprises a plurality of notches 36 with different orientations, for example six notches forming angles in the order of 60° to one another. This will be the preferred configuration when it is difficult to identify a main loading direction.

The making of the notch 36 may be included in the method of making the part 22.

The method of making the part 22 comprises at least the following stages:

positioning of fiber layers,
polymerization or consolidation of the part,
making of at least one hole 36.

According to a first variant of the method of making a part 22, the notch 36 is made before the polymerization or consolidation stage of the part 22. According to one embodiment, at least one layer of the composite material part is cut in order to form at least one notch. After the layers have been stacked, the cuts in the layers correspond to the notches. According to this embodiment, it is possible to obtain notches that do not open out at the level of the level of the two faces 24 and 26.

According to another variant of the method of making a part 22, the notch 36 is made after the polymerization or consolidation stage of the part 22, before or after the machining stage of the hole, by machining the part to form at least one notch.

According to one embodiment, the notches are made by cutting. In this case, the cutting tool is a diamond disc, the axis of rotation whereof is perpendicular to the length L1 of the notch to be made. As shown in FIG. 4, the ends of the notches have a bottom that connects one of the faces 24 and 26 of the part in the form of a radius. The width of the notch corresponds to the width of the disc and each notch is made in a single pass. This embodiment enables the production cost to be kept low.

According to another embodiment, the notches are made by slotting. In this case the cutting tool is a shell end mill, the axis of rotation whereof is oriented in the normal direction DN. This embodiment allows notches to be obtained which are not symmetrical in relation to the holes and which only extend from a single side of the hole, as illustrated in FIGS. 6A, 6B, 7A, 9A and 9B.

According to another embodiment, the notches are made once the parts have been assembled. In this case, the cutting tool is a portable tool. The advantage of this solution is that it allows parts already in place in the aircraft to be reinforced. Hence, it is possible to avoid having to change parts, which is generally expensive.

According to another embodiment, the notches are made by water-jet machining. This embodiment is quick and versatile and allows problems associated with tool wear and tear to be corrected. Moreover, it is particularly well-suited to large volumes.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of reinforcing a composite material part comprising a stack of fiber layers and at least one hole with an axis, said hole crossing said layers and opening out at the level of a first face and a second face of said part, said part having a thickness at the level of the axis of the hole, wherein the method comprises at least one stage comprising the making of at least one notch in at least one layer of the part proximate to the hole or which opens out in the hole, wherein the notch cuts a plurality of fibers in said stack of fiber layers along a cutting line that corresponds to the orientation of the notch.

2. The method according to claim 1, further comprising stages for determining at least one loading direction, the at least one notch being made oriented in a parallel direction to the loading direction.

3. The method according to claim 1, further comprising stages for determining at least one critical cracking direction, the at least one notch being made oriented in a direction perpendicular to the critical cracking direction.

4. The method according to claim 1, wherein the notch is formed tangential to the hole.

5. The method according to claim 1, further comprising a placement stage of a metallic insert to fill the notch.

6. The method according to claim 1, wherein the notch is made in a length equal to a radius of the hole.

7. The method according to claim 1, further comprising, for a same hole, a stage for making a plurality of notches oriented in one direction and disposed symmetrically in relation to a first plane of symmetry passing through an axis of the hole perpendicular to the direction of the notches.

8. The method according to claim 1, further comprising, for a same hole, a stage for making a plurality of notches oriented in one direction and disposed symmetrically in relation to a second plane of symmetry passing through the axis of the hole parallel to the direction of the notches.

9. The method according to claim 1, wherein the part comprises a plurality of holes aligned in an alignment direction, the method comprising the stage for making at least one notch, wherein the notch links a plurality of holes and is parallel to the alignment direction.

10. The method according to claim 1, wherein the notch has a depth smaller than a thickness of the part.

11. The method according to claim 10, further comprising, for a same hole, the stage of making at least a first notch which opens out at the first face, making the notch at a level of the first face and a stage of making at least a second notch which opens out at a level of the second face.

12. A method of making a stratified composite material part incorporating the method of reinforcing the composite material part according to claim 1.

13. The method of making a stratified composite material part according to claim 12, said method of making the part comprising the stages:
positioning of fiber layers,
polymerizating or consolidating of the part,
making of at least one hole,
wherein at least one layer of fibers is cut prior to the polymerization or consolidation stage to form at least one notch.

14. The method of making a stratified composite material part according to claim 12, said method of making the part comprising the stages of:
positioning of fiber layers,
polymerizating or consolidating of the part,
making of at least one hole,
wherein the part is machined after the polymerization or consolidation stage to form at least one notch.

15. A stratified composite material part comprising:
a stack of fiber layers,
at least one hole extending through the stack of fiber layers opening at a level of a first face of the part and at a level of a second face of the part, a notch formed in at least one of the fiber layers proximate to the hole or opening into the hole, wherein the notch cuts a plurality of fibers in said stack of fiber layers along a cutting line that corresponds to the orientation of the notch.

* * * * *